July 24, 1934.     C. S. OLSON     1,967,448
DISPENSER
Filed Dec. 23, 1932

Inventor
Chas' S. Olson.
By
Geo. Stevens.
Attorney

Patented July 24, 1934

1,967,448

UNITED STATES PATENT OFFICE 1,967,448

DISPENSER

Charles S. Olson, Duluth, Minn.

Application December 23, 1932, Serial No. 648,635

4 Claims. (Cl. 221—11)

This invention relates to dispensing devices and has special reference to such an embodiment adapted for use on receptacles like coffee cans, baking powder cans, and the like; it being especially designed for the purpose of selectively dispensing from time to time a predetermined amount of the contents of the receptacle, and, when used in connection with a commodity such as coffee, of which a given amount such as a tablespoonful is universally used for each predetermined measurement of the subsequently prepared drink like a cupful is desired, the capacity of the dispenser will be made to hold one tablespoonful.

The principal object of the invention is to produce as practical and efficient a device of this character as possible.

Another object is to provide such a device of simple application to a receptacle as possible.

A further object is that of providing novel means whereby the measuring device will be uniformly filled with the contents of the can when the latter is properly manipulated, and hold its contents when adjusted outwardly from the receptacle without spilling.

Still another object is that of providing simple means for adjustment of the measuring device within the receptacle when full.

A still further object is that of providing means for securely sealing the device within the receptacle in a manner not heretofore known.

Other objects and advantages of the invention will appear in the following description thereof.

In the accompanying drawing, forming part of this application, and wherein like reference characters indicate like parts:

1 represents the top of the can, such as coffee is commonly marketed in, and these tops are frequently formed with outwardly bulged rib-like portions as indicated at 2, they being flat or rounded on their upper surface as desired.

In the convenient application of my improved dispenser on such a can it is contemplated to employ such a rib about the opening formed through the top of the can, the convenience of which will be described later, such a rib about the opening being illustrated at 3 and preferably flat on its uppermost surface.

Figure 3:
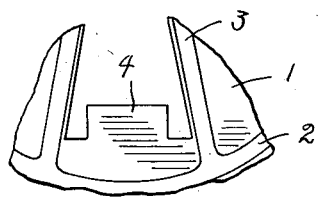
Figure 3 is a fragmental portion of the top of the can or receptacle as stamped to provide for the novel hinge attachment.

The opening through the cover is rectangular in shape, being wider at the end adjacent the circumferential portion of the can and less adjacent the center thereof, with straight inclined side portions. When this hole is struck in the can during the manufacture of same, it is intended to provide means for subsequent attachment of the dispenser by forming in the wider portion of the opening the flap 4 as illustrated in Figure 3 of the drawing. Just above the innermost and smaller terminus of the opening is formed a slight depression as indicated at 5 in the cover to provide fingernail space in the tipping of the dispenser outwardly of the can.

Figure 4:
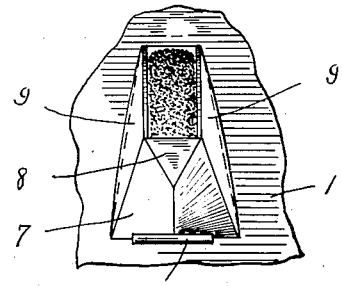
Figure 4 is an inside end elevation of the dispenser as illustrated in Figure 2.
Figure 5:
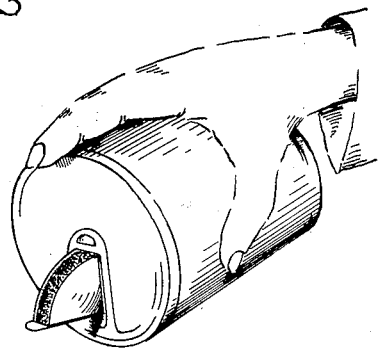
Figure 5 is a perspective view of a can equipped with the dispenser, illustrating the latter as being full of the contents of the can and tipped outwardly therefrom ready for dispensing.

Now the dispenser itself is of triangular form comprising the cover 6, bottom 7, end 8, and sides 9, the latter being in plan view substantially segmentally shaped, as when the dispenser is oscillating upon its hinged portion at the juncture of the cover 6 and bottom 7, the uppermost edges of the sides must form a snug fit within the upper corners of the opening through the can cover. Furthermore, to insure a close fit of the sides against the inclined sides of the opening they are bulged somewhat as clearly indicated in Figure 4.

Now the bottom of the dispenser is V-shaped, converging progressively from the hinged portion thereof to the extreme end portion 8, the latter being triangular in form with the upper edge thereof extending beyond the termini of the sides to form an adequate stop for the dispenser when in fully opened position, and the bottom is thus shaped, converging downwardly from either side at the junction with sides 9 to the center line, from the hinge 4 to the apex of the triangular end portion 8, for convenience in forcing the dispenser into the contents of the can when the latter is full, or substantially so, thus materially reducing the frictional resistance during such operation.

It is found by this novel shaping of the dispenser that it will readily hold its entire capacity of the material being dispensed, even though it be slightly tipped or moved, without spilling same, as the wedge shape is found conducive to such by the restriction of the upper circumferential edges of the dispenser.

Figure 2:
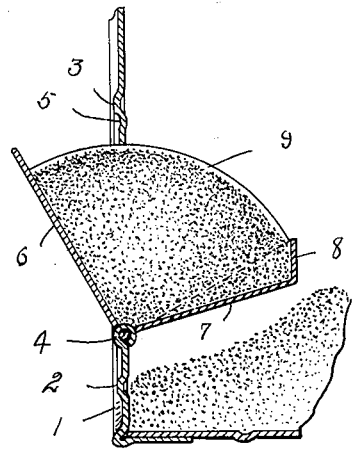
Figure 2 is a section on the line 2—2, Figure 1.

When the dispenser is first formed and prior to its attachment to the cover, it is provided with two slots in close juxtaposition to the juncture of and located one in the top 6 and one in the bottom 7 thereof; these slots being of the proper width to receive the flap 4 previously described. In the assembly of the device the flap is simply slipped through these slots and bent over as illustrated in Figure 2, thus forming the hinge for the dispenser.

Figure 1:
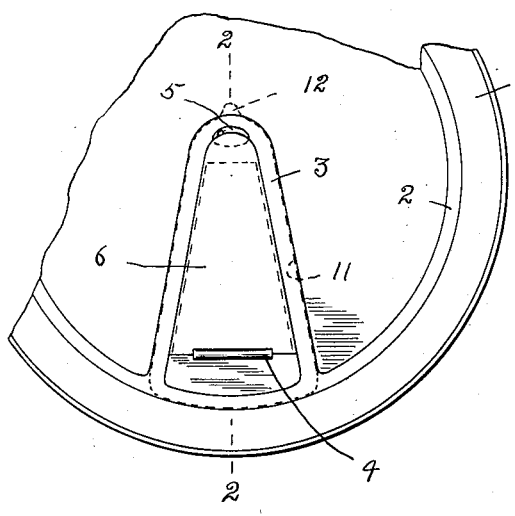
Figure 1 is a plan view of a fragmental portion of a top of a can equipped with the invention.

Now the question of securely sealing such a device to the cover of a receptacle is important in that it should not necessitate the breaking of the material of which either the dispenser or cover is composed, and to overcome which I have illustrated in dotted lines Figure 1, at 11, a covering of adhesive removable tape and for convenience in removing the sealing member I have illustrated a tab-like projection as at 12 so that the seal may be readily stripped off, freeing the face of the dispenser; it being desirable to so assemble the device that the outer surface of the face or cover 6 of the dispenser is in the same plane with the flat outer surface of the rib 3 surrounding same.

From the foregoing it is apparent that with this form of measuring dispenser, if attached to, for example, a container of coffee, the required amount of same, per cup, may be dispensed from the container in batches, or predetermined amounts, depending upon the size of the dispenser, as it will dispense its full capacity at each operation.

Having thus described my invention, what I claim and desire to secure by Letters Patent, is:

1. The combination with a container having an opening in one end thereof, and a flap extending within said opening, of a sector shaped dispenser having a top, sides and bottom with slots through the top and bottom adjacent their line of intersection for reception of said flap whereby to form a hinged connection of said dispenser to said container.

2. The combination with a container having an opening therein and a flap extending within said opening, of a batch dispenser having a top, sides and bottom, and with slots through said top and bottom adjacent their line of intersection, said flap extending through said slots and being bent around said intersection of the top and bottom and thereby forming a hinged connection of said dispenser to said container.

3. A batch dispenser for hinged attachment to a container of granular material comprising a sector-shaped body portion having top and bottom walls at substantially right angles to each other and hinged to the container at the point of their intersection, said dispenser characterized by being materially wider longitudinally of and adjacent said hinged portion than at its marginal arcuate portion whereby to prevent objectionable spilling of the contents of the dispenser when opened and prior to materially tipping the container.

4. A pivotally operable dispenser for granular material comprising spaced sector-shaped side walls diverging towards the pivotal mounting of the dispenser, and top and bottom walls converging towards said pivotal point forming a receptacle having a relatively long narrow open terminus for the purpose described.

CHARLES S. OLSON.